United States Patent [19]

Saenz

[11] Patent Number: 4,699,401
[45] Date of Patent: Oct. 13, 1987

[54] REMOVABLE SEAT BELT COVER

[76] Inventor: Raul C. Saenz, 102 Elm St., Huntingdon, N.Y. 11743

[21] Appl. No.: 727,791

[22] Filed: Apr. 26, 1985

[51] Int. Cl.⁴ .......................................... B60R 21/00
[52] U.S. Cl. .................................... 280/808; 297/482; 224/224
[58] Field of Search ............... 280/801, 808; 297/482; 224/224; 2/247, 252

[56] References Cited

U.S. PATENT DOCUMENTS

| D. 259,151 | 5/1981 | Kishbaugh et al. | 224/224 |
| 3,306,662 | 2/1967 | Finnigan | 297/482 |
| 3,397,913 | 8/1968 | Fein | 297/482 |
| 4,057,181 | 11/1977 | Finnigan | 297/482 |
| 4,446,573 | 5/1984 | Green | 2/252 |

FOREIGN PATENT DOCUMENTS

| 2641852 | 3/1978 | Fed. Rep. of Germany | 297/482 |
| 2725850 | 12/1978 | Fed. Rep. of Germany | 280/808 |
| 2436608 | 4/1980 | France | 297/482 |
| 1581996 | 12/1980 | United Kingdom | 297/482 |

Primary Examiner—John J. Love
Assistant Examiner—Kenneth R. Rice
Attorney, Agent, or Firm—Hoffmann, Dilworth, Barrese & Baron

[57] ABSTRACT

A removable seat belt cover including an elongated foldable length of base material. The base material includes a protective cushion portion adapted to surround a selected portion of a seat belt when the base material is folded thereabout. Positioned on the base material are releasable fastener elements to interengage and retain the base material in position when folded about the seat belt portion and to permit removal of the base material therefrom when released. An article retainer is on the base material and is easily accessible for the removable storage of selected articles when the base material is affixed about the seat belt in protective cushioning position.

6 Claims, 6 Drawing Figures

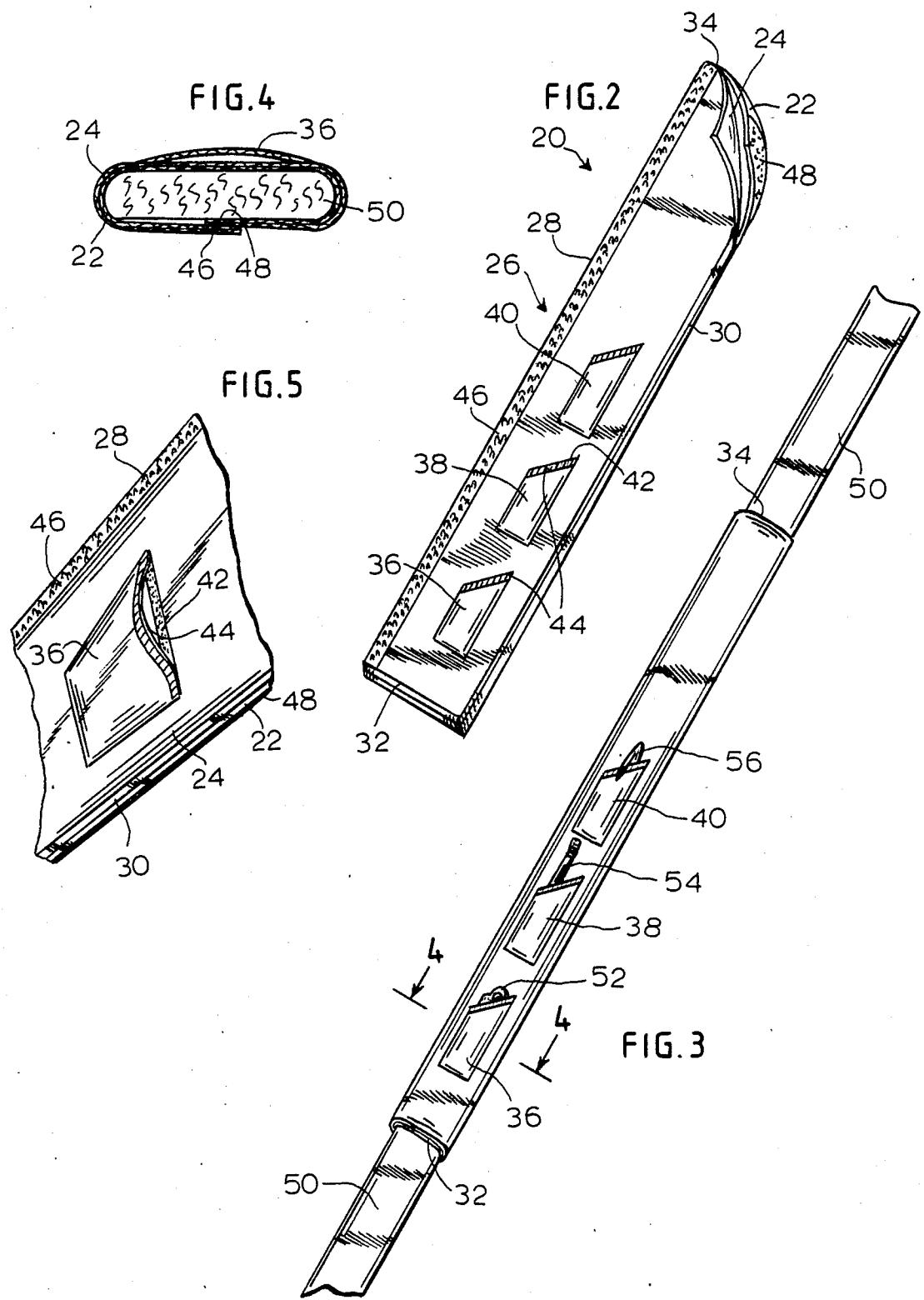

REMOVABLE SEAT BELT COVER

BACKGROUND OF THE INVENTION

The use of seat belts is becoming more and more prevalent in today's world. This is particularly true in regard to motor vehicles. For example, in the United States many states are in the process of passing laws which require the use of seat belts in automobiles with appropriate fines being assessed for violations. Accordingly, it is conceivable and readily perceivable that, shortly, the majority of drivers in the United States will be regularly employing seat belts virtually on a daily basis.

This will serve to aggravate and increase already known difficulties encountered with existing acceptable seat belt structures. This in regard to both the waist strap portion and the shoulder strap portion of commercially available seat belt arrangements.

One major difficulty is in concerns personal discomfort. The seat belts are anchored to the body of the vehicles and are subjected to spring tension which causes the seat belt structure to bear against the user's body. This often leads to uncomfortable conditions. Only limited movement against spring tension is available. This is understandable since the purpose of the belt is to fix the person in position in the vehicle and maintain that position even when subjected to the violent forces of a motor vehicle accident. It should also be kept in mind that vehicle drivers and passengers come in all sizes and shapes and, therefore, seat belts bear against various portions of a person's anatomy and can cause minor or severe discomfort. A neck rash, for example, is a common problem.

A further difficulty is in connection with soiling of the user's clothing. Automobiles are normally used over an extended period of time and accordingly, the seat belts in those vehicles are also used for many years. They tend to become worn and dirty as time goes on and there is relatively continuous use. In fact, even during non-use, the seat belts will become dusty and accumulate dirt and other substances that can discolor and soil one's clothing.

A further consideration in connection with existing types of seat belts is that they serve only a single function, that is to protect the user from injury in the time of an accident. It would be advantageous if other uses can be developed for seat belts whereby the benefits to the driver and passengers are enhanced.

Certain of the problems discussed above have been recognized and various solutions have been suggested and tried.

For example, German Pat. No. 26 41 852 discloses disposable protective sheathing for seat belts. The sheathing is placed on the portion of the seat belt webbing which is in constant contact with the user's clothing in order to protect the clothing from being soiled by the webbing. The material for the sheathing is constructed of paper or plastic and is stored in a roll form in a dispenser mechanism fitted in a convenient place inside the automobile. A desired amount of the material is torn off and used to wrap around the width of the chosen portion of the webbing with an additional overlap portion. An adhesive coating binds the overlap portion to the remainder of the material as it surrounds the webbing. When the wrapping gets soiled, it is torn off the webbing and replaced by a clean one.

Another selected solution is offered by British Pat. No. 1 581 996. Again, the problem addressed by the patentee involves the soiling difficulty present with continuous seat belt use. In this instance, a resilient filling material is positioned between smooth inner and outer soft pile fabrics to form a removable seat belt sleeve.

French Pat. No. 2 436 608 addresses the problem of discomfort. It discloses a pad of soft material permanently or temporarily affixed to the vehicle safety belt at the location of contact with the wearer.

U.S. Pat. No. 3,306,662 discloses a seat belt attachment with perforations to provide for a cooling or heating flow of air to the wearer and is designed to prevent perspiration spoilage of the person's clothing lying immediately below the belt. Attachment is accomplished by means of lacing or by use of a zipper.

Finally, U.S. Pat. No. 3,397,913 discloses the use of a seat belt attachment with a fur-like substance on its exterior surface for decorative purposes. The device is a snap-on structure.

It is clear that further improvement is needed in seat belt protective structures for minimizing the occurrence of soiling of clothing and personal irritation. Also, more versatile structures are desirable to minimize cost and to add to the convenience of the vehicle operator.

SUMMARY OF THE INVENTION

With the above background in mind, it is among the objectives of the present invention to provide a removable seat belt cover adapted to be easily and efficiently attached and removed to a selected portion of a vehicle seat belt.

It is a further objective to provide a seat belt cover which acts as a cushion to ease the danger of irritation or discomfort for the operator when wearing a seat belt.

A further objective is to provide a seat belt cover which protectively covers the seat belt in a manner which alleviates the danger of soiling of the wearer's clothes when the seat belt is being used.

A still further objective is to provide a seat belt cover which is attachable to selected portions of the length of the seat belt to accommodate for different size and shaped users in providing the cushioning effect and in protecting against soiling of clothing.

A still further objective of the present invention is to provide a seat belt cover which includes article retaining means as part of its structure to facilitate use as a key or change holder, for example, when the seat belt is being worn and the automobile is being operated.

A further objective of the present invention is to provide a seat belt cover with a series of pockets along the length of its exposed side when attached to the seat belt. Each product can be used, for example, for keys, pens or pencils, or change for tolls and the like.

A further objective of the present invention is to provide a seat belt cover which is easily attachable and removable to a selected portion of the seat belt with the attachment means being in the form of mating Velco type hook and eyelet fastener strips on mating surfaces of the cover. It is also contemplated that each of the pockets can be sealed by means of mating Velco type hook and eyelet strips along the edge of the pocket adjacent the opening to the interior thereof.

A further objective of the present invention is to provide one or more pockets along the removable seat belt cover with each pocket having an oblique edge adjacent the opening to each pocket. The oblique edge is arranged to facilitate insertion and removal of the user's hands thereby facilitating access to the interior of the pocket and removal or insertion of suitable objects to be retained therein.

A still further objective of the present invention is to provide a seat belt cover with at least a portion thereof formed of a cushioning material, for example foam rubber or plastic. The removable seat belt cover of the present invention can be formed of a single material or a combination of materials. For example, the seat belt cover can be formed with a fabric liner to facilitate its slidable engagement with the surface of the seat belt to which it is applied and provide for ease of adjustment and a covering of cushioning material affixed thereto and forming the outer surface of the seat belt cover when applied to the seat belt.

Also, it is contemplated that the seat belt cover of the present invention can be formed of an inner liner of cotton and polyester blend fabric and an outer material selected from the group consisting of fabric, wool, fur, fake fur, shupa or cotton.

It is further contemplated that the Velco type hook and eyelet fastener strips be attached along opposing longitudinal edges on opposite sides of the seat belt cover so when the cover is folded about a portion of the seat belt, the Velco type hook and eyelet fastener strips will mate and interengage thereby holding the seat belt cover in position at the selected location on the seat belt. Removal is accomplished in an easy and efficient manner by detaching the Velco type hook and eyelet fasteners and quickly separating the cover from the seat belt.

In summary, the removable seat belt cover is formed of an elongated foldable length of base material. The base material includes a protective cushion portion adapted to surround a selected portion of a seat belt when the base material is folded thereabout. A releasable fastener means is on the base material in position to engage and retain the base material in position when folded about the seat belt portion to permit removal of the base material therefrom when released. An article returning means is on the base material and is easily accessible for the removable storage of selected articles when the base material is affixed about the seat belt in protective cushioning position.

With the above objectives among others in mind, reference is made to the attached drawing.

BRIEF DESCRIPTION OF THE DRAWING

In the drawing:

FIG. 2 is a perspective view of the seat belt cover showing the layers separated at one end;

FIG. 3 is a top plan view of the seat belt cover attached to a portion of a seat belt and with articles being held in the pockets of the seat belt cover;

FIG. 4 is a sectional view thereof taken along the plane of line 4—4 of FIG. 3;

FIG. 5 is an enlarged fragmentary view of a portion of the seat belt cover; and

DETAILED DESCRIPTION OF THE DRAWING

Figure 1:
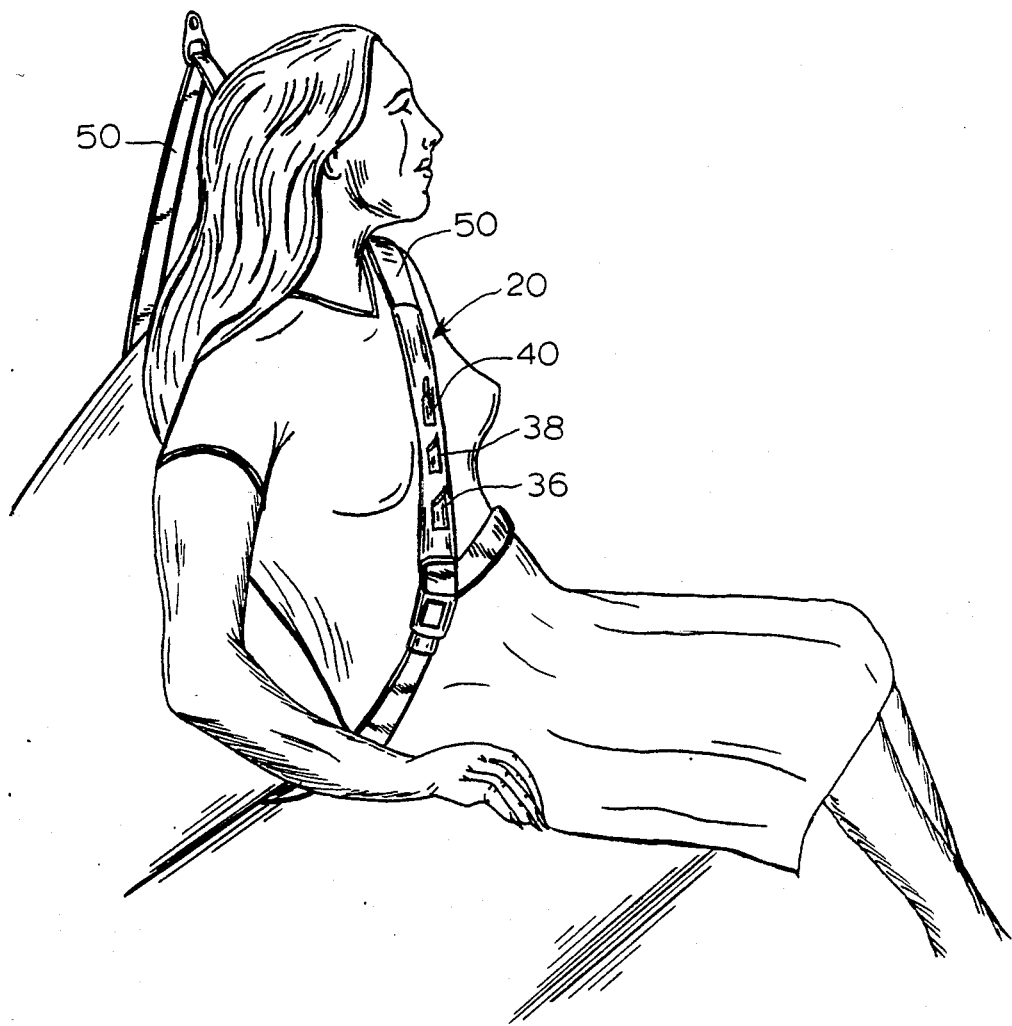
FIG. 1 is a perspective view of the seat belt cover of the present invention attached to the shoulder strap portion of a vehicle seat belt in use in restraining a vehicle passenger.
Figure 6:
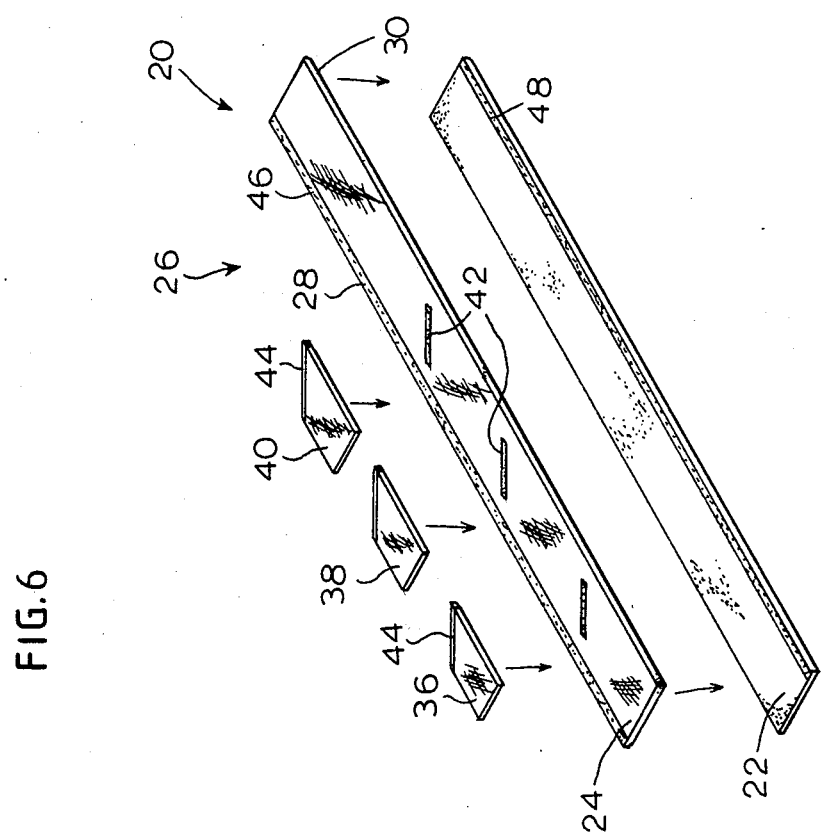
FIG. 6 is an exploded view of the seat belt cover.

As shown in the drawing, seat belt cover 20 is formed of an elongated foldable length of base material. As depicted the base material includes a liner 22 and a cushioning fabric 24. The liner 22 and the fabric 24 are of similar size and configuration and are affixed to one another in a conventional well known manner, for example, by sewing or adhesive. The composite of liner 22 and fabric 24 forms the foldable elongated base 26. The base 26 has two opposing longitudinal edges 28 and 30 and two shorter opposing lateral edges 32 and 34.

Attached to the exposed outer surface of fabric 24 are three spaced longitudinally aligned pockets 36, 38 and 40. As shown, the pockets are of the same size and configuration, however, they can be formed of different sizes and shapes as desired. Additionally, the pockets can be arranged in other chosen alignments if so desired.

Each depicted pocket is substantially rectangular in configuration with three closed sides and an open side. The open side edge 42 of each pocket is angled obliquely with respect to the two adjacent parallel closed sides of the pocket to facilitate insertion and removal of articles with respect to the interior of the pocket. The oblique edge of each open side 42 edge of a respective pocket has a strip of Velcro type hook and eyelet fastener element 44 affixed thereto in a conventional manner. Mating Velcro type hook and eyelet fastener strips 43 are positioned on the upper surface of fabric 22 in alignment with strips 44 so that depression of the open side edge 42 of each pocket will engage the mating Velcro type hook and eyelet fastener strips 44 with fastener strips 43 on the upper surface of the fabric 24 to thereby seal the pocket in closed position. Opening of each pocket can be accomplished by merely grasping the upper edge 42 and detaching the engaging Velco type hook and eyelet fastener elements to permit access through the open end of the pocket to the interior thereof.

Adjacent longitudinal edge 28 of the exposed surface of fabric 24 is a longitudinal strip of Velcro type hook and eyelet fastener material 46. A mating Velcro type hook and eyelet fastener strip 48 is positioned adjacent longitudinal edge 30 of base material 26 on the exposed surface of liner 22. Thus, when base material 26 is folded about a central longitudinal axis, Velcro type hook and eyelet fastener elements 46 will engage mating Velcro type hook and eyelet fastener elements on strip 48 and retain the base material in the folded condition. The material is released by applying sufficient force in a conventional manner to detach strip 46 from strip 48.

In use, the base material 26 is formed with selected length to cover a chosen portion of a seat belt shoulder strap or waist strap as desired. In the depicted form, the material is shaped to cover a portion of a shoulder strap portion of a seat belt assembly 50. The seat belt assembly 50 is drawn into position and the seat belt cover 20 is wrapped around the chosen portion of the strap 50 whereupon Velcro type hook and eyelet fastener strip 46 is brought into mating engagement with Velcro type hook and eyelet fastener strip 48 and the cover remains in attached position. This condition is depicted in FIG. 1 of the drawing.

Suitable articles can be positioned in pockets 36, 38 and 40 as depicted in FIGS. 1 and 3. In FIG. 3, a key 52 is positioned in pocket 36, a pencil 54 is shown in pocket 38 and a pen 56 is shown in pocket 40. Naturally, other articles can be stored in the pockets as well including change for tolls or money for other purposes.

When the operator no longer requires the seat belt cover, the Velcro type hook and eyelet fastener element strips 46 and 48 are separated and detached in a conventional manner thereby quickly and easily freeing the cover 20 from the seat belt 50. The cover 20 can be replaced, cleaned or stored in a convenient location of the car in ready condition for reuse.

When folded about the strap 50, the seat belt cover 20 acts as a protection for the user against having the clothes soiled by a dirty seat belt strap which often occurs when the seat belt has been used many times and over a prolonged period of time. The cover 20 can be replaced at selected intervals and cleaned as well and maintained in acceptable condition so that it will not endanger the tidiness and cleanliness of the user's clothes.

Additionally, the seat belt cover 20 acts as a cushion to protect the user from undo irritation or pressure at various points of the body from the seat belt. Often, a seat belt will rub or chafe the user's neck or other parts of the body causing irritation, rashes or other discomfort. The length of cover 20 is a matter of choice in order to accomdate varous size and shape users.

The beveled or oblique open edges of the pockets is also a matter of choice. Alternatively, the pockets can be entirely square or rectangular in configuration or even round or oval. Additionally, the access opening can be along any chosen side edge of the pocket. The object is to provide ease of access for the hand of the user to insert and remove articles from the respective pockets. It is not necessary that all of the pockets be the same size and configuration or in alignment as shown. Alternatively, they can be arranged in different patterns and formed in different sizes and shapes.

In addition to the affixed double layer arrangement of liner 22 and fabric 24, a single piece of combination liner and fabric can be employed to serve as the length of base material.

One advantage of using a two piece arrangement with a liner and a fabric cushioning material is the ability to provide the liner with a smoother surface so that it can be easily shifted along the length of the seat belt to adjust for proper location to comfort the individual passenger and to accomodate and not interfere with retraction of the seat belt into its holder when released. The outer layer would have the cushioning material of the desired type to provide the desired protective and comfort criteria.

Naturally, the cost factor is also a consideration in deciding whether one should use a single piece of material for the cover or to use two separate attached pieces.

One acceptable configuration and size for the cover which has been found to be useful in common conventional seat belt arrangements presently on the market is depicted in the drawings. It is substantially rectangular in configuration with a width of 5½ inches and a length of 24 inches. A ¾ inch Velcro type hook and eyelet fastener strip is positioned along the peripheral edge on one side of the cover and a complementary ¾ inch Velcro type hook and eyelet fastener strip is affixed to the opposite longitudinal peripheral edge of the cover on the reverse side of the cover. An arrangement of three pockets are sewn onto the exposed surface of the cover. Each pocket is provided with an oblique edge adjacent the open side of the pocket and is otherwise substantially rectangular. The pocket is 2½ inches wide and is 4 inches long on the longer longitudinal side and 2½ inches long on the shorter longitudinal side. Mating ¼ inch Velcro type hook and eyelet fastener strips are positioned respectively on the oblique edge portion of each pocket and the corresponding portion of the cover surface thereby facilitating the closing and opening of each respective pocket.

The lining of the two piece cover arrangement can be formed of a conventional fabric material such as a mixture of cotton and polyester, or any common commercially available substitute therefor. The cushioning or fabric portion of the two piece cover arrangement can be formed of a textured fabric, wool, fur, fake fur, shupa or cotton or any well known conventional commercial substitute therefor.

It is also contemplated that a plastic foam or rubber material can be used for either the liner or outer portion of the cover.

As stated above, it is also feasible to have a one piece cover with a side suitable for engagement with the seat belt and the other side providing the textured surface for the protective and cushioning feature.

The material for the individual pockets is also a matter of choice. In the depicted embodiment, the material for the pockets is the same as the material on the adjacent layer of the cover which will be the exterior and visible layer of the seat belt cover.

Thus, the several aforementioned objects and advantages are most effectively attained. Although several somewhat preferred embodiments have been disclosed and described herein, it should be understood that this invention is in no sense limited thereby and its scope is to be determined by that of the appended claims.

What is claimed is:

1. A removable seat belt cover comprising:
   an elongated foldable length of base material having two opposed substantially parallel longitudinal edges, said base material including a protective cushion portion adapted to surround a selected portion of a seat belt when the base material is folded thereabout,
   releasable fastener means on the base material in position to engage and retain the base material in position when folded about the seat belt portion and permit removal of the base material therefrom when released,
   article retaining means on the base material and easily accessible for the removable storage of selected articles when the base material is affixed about the seat belt in protective cushioning position,
   the fastening means including the mating hook and eyelet type fastener elements,
   the mating hook and eyelet type fastener elements being located on opposing sides of the base material so that when the base material is folded about the seat belt, the mating hook and eyelet type fastener elements will engage with one another and affix the cover to the selected seat belt portion,
   the article retaining means including at least one pocket formed by a layer of pocket material affixed to the adjacent exposed surface of the base material, each pocket in position so that when the base material is folded about the seat belt, the pocket will be exposed for use with the combined layer and adjacent exposed surface together forming a pocket on the exterior of the seat belt cover,
   the pocket being sealed along the peripheral edge thereof with the exception of one portion forming an opening to the interior thereof,
   the edge portion of the pocket material adjacent the opening to the pocket and the adjacent surface of the base material having mating hook and eyelet type fastener elements thereon so that disengagement of the hook and eyelet type fastener elements permits opening of the pocket and access to the interior thereof and engagement of the mating hook and eyelet type fastener type elements closes the opening to the interior of the pocket and retains any selected articles positioned therein, and each pocket being formed with a pair of opposed sealed side edges substantially parallel to one another and to the longitudinal edges of the base material, a sealed bottom edge substantially perpendicular to the longitudinal edges of the base material and an oblique open top edge opposite to the bottom edge and angularly disposed with respect to the edges of the pocket and the edges of the base material and angled so as to facilitate ease of access of the user to the interior of the pocket and to provide a choice of depth for each portion of the pocket to accommodate inward and outward extension of different sized and shaped articles therein when the seat belt cover is being used, and said base material being formed of a thin inner liner having a smooth exposed surface which is easily slidable with respect to the seat belt when mounted thereon, and a relatively thin attached outer layer of cushioning material to engage and cushion the user and provide the exposed surface for affixing the pocket material thereto.

2. The invention in accordance with claim 1 wherein the base material is integrally formed and is of predetermined thickness, resilience and flexibility.

3. The invention in accordance with claim 1 wherein each of the hook and eyelet type fastener elements extends along the longitudinal edge portion of one of the opposing sides of the length of base material.

4. The invention in accordance with claim 1 wherein there are three longitudinally arranged and spaced pockets along the length of the base material and each pocket has preselected dimensions to accommodate selected sizes of articles to be retained therein during use.

5. The invention in accordance with claim 1 wherein each pocket material is affixed by sewing it to the length of base material.

6. The invention in accordance with claim 1 wherein each of the pockets is formed of pocket material which is the same material as at least a portion of the base material.

* * * * *